UNITED STATES PATENT OFFICE 2,262,544

SOLUBLE SULPHANILAMIDE DERIVATIVES AND PROCESS FOR MAKING THEM

Robert Ludovic Despois, Choisy-le-Roi, Seine, France, assignor to Societe des Usines Chemiques Rhone-Poulenc, Paris, France, a corporation of France No Drawing. Application November 17, 1937, Serial No. 175,034. In Great Britain December 15, 1936

11 Claims. (Cl. 260—397.7)

The present invention relates to the preparation of new derivatives of aromatic amines derived from para-amino-benzene-sulphonamide.

It is known (Goissedet et al., Comptes Rendus Soc. Biol., 1936, vol. 121, pages 1082–1084) that it is possible to prepare products having therapeutic value and well suited for hypodermic injection by condensing para-amino-benzene-sulphonamide with formaldehyde and an alkali-metal bisulphite.

According to the present invention it has been found that aliphatic unsaturated aldehydes, aromatic aldehydes, aryl-aliphatic aldehydes, saturated or unsaturated in the aliphatic side chain, react with bisulphites and para-amino-benzene-sulphonamide, or its nuclear substituted derivatives to furnish new substances soluble in water and having great therapeutic value and well adapted for use by hypodermic injection. The nuclear substituted derivatives above mentioned comprise in general substituents of a not too readily reactive character and in particular the lower alkyl nuclear derivatives, containing up to 5 carbon atoms in the substituent groups, the lower alkoxy (methoxy to amyloxy) nuclear derivatives, and the chloro, bromo, or iodo nuclear derivatives.

These compounds can be represented by the formula

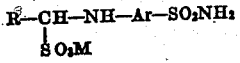

in which R represents a member of the group consisting of an aryl radical, an aralkyl radical, a sulphonated aliphatic radical and an aralkyl radical sulphonated in the aliphatic chain and in which Ar represents an aryl radical and M represents an alkali metal.

In the case of the aromatic aldehydes and aryl-aliphatic aldehydes having a saturated aliphatic side chain, these can be caused to react directly with equal molecular quantities of a mixture of bisulphite and of para-amino-benzene-sulphonamide or its substituted derivatives. Equally their bisulphite derivatives can be used and caused to react in equimolecular proportions with the amino-benzene-sulphonamide or its derivatives. The Schiff's bases obtained by condensation of these aldehydes with para-amino-benzene-sulphonamide or its substituted derivatives can also be used as starting material, these Schiff's bases being then afterwards treated with bisulphites.

In the case of aldehydes presenting an unsaturated aliphatic chain, the preparation can be carried out as above, but as these aldehydes are capable of combining with bisulphites at their double bonds in the aliphatic chain, sufficient of the bisulphite should be used to satisfy all the possibilities of reaction with this substance. For example, if one molecular proportion of crotonic aldehyde or of cinnamic aldehyde is used, at least two molecular proportions of sodium bisulphite should be used.

The following examples illustrate how the invention may be carried out in practice, but it is to be understood that the invention is in no way limited to the details given in these examples:

Example 1

(a) Benzaldehyde ($\frac{1}{10}$ mol.) _____grams__ 10.6
Para-amino-benzene-sulphonamide
($\frac{1}{10}$ mol.) _____grams__ 17.2
2N solution of sodium bisulphite
($\frac{1}{10}$ mol.) _____cc__ 50 are heated together for 2 hours at 90° C. in a flask fitted with a stirrer and a reflux condenser. 55 grams of crystalline sodium acetate is then added. The product is filtered and allowed to cool and crystallise, whereupon the crystals are drained and washed carefully with water and then with 60% alcohol. The product is then dried and consists of benzylamino-benzene-sulphonamide-ω-sulphonate of soda:

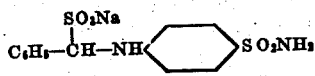

This substance showed on analysis:

|  | Per cent |
|---|---|
| Nitrogen 7.6% theoretical | 7.69 |
| Sulphur 17.2% theoretical | 17.58 |

(b) The same product is obtained by heating together in the above manner:

Dry benzaldehyde-sodium-bisulphite
($\frac{1}{10}$ mol.) _____grams__ 21
Para-amino-benzene-sulphonamide
($\frac{1}{10}$ mol.) _____do____ 17.2
Water _____cc__ 50

The subsequent treatment is carried out as in (a).

(c) The same result is obtained by starting from benzylidene-amino-benzene-sulphonamide (melting point 204° C.) prepared by the condensation of benzaldehyde, and para-amino-benzene-sulphonamide in alcoholic solution. One then heats in the same manner as given under (a):

Benzylidene-amino-benzene-sulphonamide
(1/10 mol.) _____ grams__ 26
2N solution of sodium bisulphite
(1/10 mol.) _____ cc__ 50 and the preparation continued as under (a).

*Example 2*

Phenylacetaldehyde (1/10 mol.) _____ grams__ 12
Para-amino-benzene-sulphonamide
(1/10 mol.) _____ do____ 17.2
2N solution of sodium bisulphite
(1/10 mol.) _____ cc__ 50 are heated for 3 hours on a boiling water bath. The compound

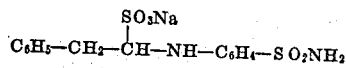

is thus obtained.

*Example 3*

(a) 3.71 N sodium bisulphite solution___ cc__ 200
Cinnamic aldehyde_____ grams__ 49 are stirred in the cold in a flask fitted with a stirrer and a reflux condenser. The contents are then heated for half an hour at 90° C. and 63.8 grams of amino-benzene-sulphonamide then added. The product is then filtered and allowed to crystallize, the crystals being then drained and washed with a little water and treated with alcohol, and dried in a vacuum. There is thus obtained a white, crystalline product which is para-[γ-phenyl-propylamino]-benzenesulphonamide-α-γ-disulphonate of soda:

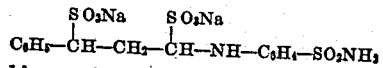

Found by analysis:

| | Per cent |
|---|---|
| Nitrogen, 5.57% theoretical | 5.66 |
| Sulphur, 19% theoretical | 19.4 |

(b) The same product is obtained by mixing and heating at the start the three constituents, namely, sodium bisulphite, cinnamic aldehyde and amino-benzene-sulphonamide.

(c) By starting with the Schiff's base having a melting point of 240° C. prepared from cinnamic aldehyde and para-amino-benzene-sulphonamine in alcohol, the same product can be obtained.

1/20 mol. proportion of cinnamylidene-amino-benzene-sulphonamide _____ grams__ 14.3
1/10 mol. proportion of sodium bisulphite solution (N) _____ cc__ 100 are heated at 90° C. for 2 hours and treated as above.

*Example 4*

The cinnamic aldehyde in Example 3 can be replaced by the equivalent molecular quantity of acrylic aldehyde or crotonic aldehyde and there are then obtained the compounds having the formulae:

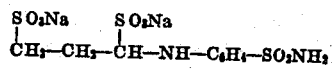
and
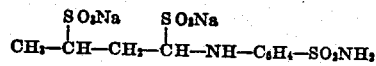
respectively.

What I claim and desire to secure by Letters Patent is:

1. The water-soluble therapeutically active compound

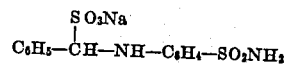

2. The water-soluble therapeutically active compound

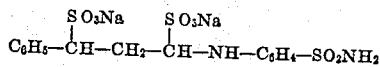

3. The water-soluble therapeutically active compound

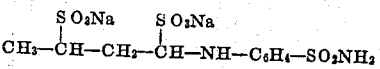

4. Process for preparing water-soluble compounds of therapeutical value, which consists in stirring at ordinary temperature a phenyl lower mono-unsaturated aliphatic aldehyde with at least two molecular proportions of an alkali metal bisulphite, and heating the resulting mixture with p-amino-benzene-sulphonamide.

5. Process for preparing water-soluble compounds of therapeutical value, which consists in stirring at ordinary temperature a lower mono-unsaturated aliphatic aldehyde with at least two molecular proportions of an alkali metal bisulphite, and heating the resulting mixture with p-amino-benzene-sulphonamide.

6. Process for preparing water-soluble compounds of therapeutical value, which consists in stirring an aldehyde of the group consisting of benzaldehyde, the phenyl lower aliphatic aldehydes saturated in the side chain, the phenyl lower aliphatic aldehydes mono-unsaturated in the side chain, and the lower mono-unsaturated aliphatic aldehydes with an alkali metal bisulphite to form a bisulphite compound, and then heating the resulting bisulphite compound with p-amino-benzene-sulphonamide.

7. Process for preparing water-soluble compounds of therapeutical value, which consists in condensing in alcohol an aldehyde of the group consisting of benzaldehyde, the phenyl lower aliphatic aldehydes saturated in the side chain, the phenyl lower aliphatic aldehydes mono-unsaturated in the side chain and the lower mono-unsaturated aliphatic aldehydes, with p-amino-benzene-sulphonamide to form a Schiff's base, which is then heated with a solution of alkali metal bisulphite.

8. Process for preparing water-soluble compounds of therapeutical value, which consists in heating an aldehyde of the group consisting of benzaldehyde, the phenyl lower aliphatic aldehydes saturated in the side chain, the phenyl lower aliphatic aldehydes mono-unsaturated in the side chain, and the lower mono-unsaturated aliphatic aldehydes with p-amino-benzene-sulphonamide and a solution of an alkali metal bisulphite.

9. Process for preparing water-soluble compounds of therapeutical value, which consists in heating a phenyl lower aliphatic aldehyde with p-amino-benzene-sulphonamide and a solution of an alkali metal bisulphite.

10. The water-soluble therapeutically valuable compounds represented by the formula

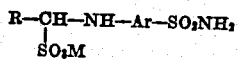

in which R represents a member of the group consisting of a phenyl radical, a benzyl radical, a sulphonated saturated lower aliphatic radical and a phenyl lower aliphatic radical, sulphonated on the side chain, of the type $$C_6H_5-CH-CH_2-$$
$$\quad\quad\;\;|$$
$$\quad\quad SO_3M$$

and in which Ar represents a benzenoid radical, and M represents an alkali metal.

11. Process for preparing water-soluble compounds of therapeutical value, which consists in treating p-amino-benzene-sulphonamide and an alkali metal bisulphite with an aldehyde of the group consisting of benzaldehyde, the phenyl lower aliphatic aldehydes saturated in the side chain, the phenyl lower aliphatic aldehydes mono-unsaturated in the side chain, and the lower mono-unsaturated aliphatic aldehydes to effect the ultimate condensation of these reagents, whereby are formed compounds represented by the formula $$R-CH-NH-Ar-SO_2NH_2$$
$$\quad\;\;|$$
$$\quad SO_3M$$

in which R represents a member of the group consisting of a phenyl radical, a benzyl radical, a sulphonated saturated lower aliphatic radical and a phenyl lower aliphatic radical sulphonated on the side chain, of the type $$C_6H_5-CH-CH_2-$$
$$\quad\quad\;\;|$$
$$\quad\quad SO_3M$$

and in which Ar represents a benzenoid radical, and M represents an alkali metal.

ROBERT LUDOVIC DESPOIS.